United States Patent [19]

Neff et al.

[11] Patent Number: 5,405,554
[45] Date of Patent: Apr. 11, 1995

[54] HIGH PERFORMANCE DEWATERING AIDS

[75] Inventors: Roger E. Neff; Joseph J. Pellon, both of Stamford; Roderick G. Ryles, Milford, all of Conn.

[73] Assignee: Cytec Technology Corp., Wilmington, Del.

[21] Appl. No.: 477,010

[22] Filed: Feb. 8, 1990

[51] Int. Cl.⁶ ............... B01D 17/00; B01J 13/00; C02F 1/56; C02F 11/14
[52] U.S. Cl. .................. 252/309; 210/734; 252/180; 252/358; 524/801; 524/922
[58] Field of Search .............. 252/309, 358, 180; 524/801, 922

[56] References Cited

U.S. PATENT DOCUMENTS

| Re. 28,807 | 5/1976 | Panzer et al. | 528/405 |
|---|---|---|---|
| 4,179,370 | 12/1979 | Hübner et al. | 210/734 |
| 4,250,269 | 2/1981 | Buckman et al. | 524/514 X |
| 4,454,047 | 6/1984 | Becker et al. | 252/358 X |
| 4,676,913 | 6/1987 | Easterly, Jr. et al. | 210/738 X |
| 4,720,346 | 1/1988 | Flesher et al. | 524/922 X |
| 4,783,270 | 11/1988 | Murao et al. | 252/358 X |

*Primary Examiner*—Richard D. Lovering
*Attorney, Agent, or Firm*—Frank M. Van Riet

[57] ABSTRACT

Water-soluble, branched, high molecular weight, cationic polymers are used in combination with low molecular weight, cationic polymers to provide the highly improved dewatering of suspended solids. Water-in-oil emulsions containing these cationic polymers in the aqueous phase are also described.

8 Claims, No Drawings

5,405,554

HIGH PERFORMANCE DEWATERING AIDS

BACKGROUND OF THE INVENTION

Many common substrates in commerce, e.g., municipal sludges, which exist as finely divided particles or fibers suspended in water, need to be removed from suspension by a separation process which provides a manageable, high solids mass and a clear effluent by-product stream. Such a process results in the separation of the solids (in a high density, tractable form, ready for proper disposition) from an aqueous effluent stream which is low in solids, whereby pollution and environmental problems are abated at low cost.

Sewage sludges must be flocculated and dewatered, and the by-product stream issued into the environment, in most cases. The sludge must be dewatered sufficiently such that disposition by incineration or by landfilling is manageable and economically feasible. With regard to the latter, i.e., economic feasibility, small increases in cake solids can make a significant difference in incineration and/or disposal costs, as little as a 1% absolute increase in cake solids in large facilities handling municipal sludges where incineration is used, reducing the quantity of fuel needed for burning of the cake by several thousand gallons per day. Obviously, this is an important cost saving. In some cases, an increase in cake solids of several percent can render the mass not only manageable but high enough in solids so that it burns autogenously in incineration. Thus, with a dry enough cake the combustion process is self-supporting and the use of added fuel is significantly reduced.

In regard to landfill operations, sites are becoming overloaded, and in some localities, new sites are not available. Achieving drier cakes in the plant reduces the amount of water transported and its concomitant transportation costs and reduces the actual landfill volume requirement.

The use of mixtures of two water-soluble, cationic polymers of differing molecular weights for sludge dewatering is disclosed by Mogelnicki, et al, in U.S. Pat. No. 3,409,646 granted Jun. 1, 1966, however, the dewatering performance of such systems have not resulted in the degree of separation desired in commercial operations.

Alienson, et al, in U.S. Pat. No. 4,699,951, have also shown that clarification of wastes is accomplished by use of a mixture of two polymers, one a lower molecular weight, cationic polymer with such weights in the range of 10,000 to 1,000,000 and the other a cationic polymer with a molecular weight from 1 to 50 million. However, the use of highly branched, high molecular weight, water-soluble polymers is not disclosed by these workers. Moreover, the waste waters, which are clarified in the Alienson, et al patent, are oily wastes from refinery, petroleum and chemical processes, and the like, and are not disclosed as useful for the treatment of biological sludges.

Pech, in French Patent Application 2,598,145, describes the use of branched vinyl or acrylic addition polymers, which are made in the presence of a high activity chain transfer agent, for the flocculation of organic sludges. However, the polymers disclosed in this patent have solution viscosities of 2,200 to 3,600 mPa.s at 20% polymer concentrations, showing that they are very low in molecular weight, i.e., below one million. Such low molecular weight polymers are less effective in sludge dewatering than other systems. Also, Pech does not disclose any combined use of cationic polymers in dewatering.

SUMMARY OF THE INVENTION

It has now been found, unexpectedly, that improved dewatering of suspended matter, leading to higher solids and more manageable cakes and masses can be accomplished using a combination of 1) an unsheared, branched, high molecular weight, cationic polymer and 2) a low molecular weight, cationic polymer. This improved dewatering activity is observed not only relative to known mixtures of linear, high molecular weight cationic polymers and lower molecular weight polycationics but even relative to the branched, high molecular weight, cationic polymer per se.

While not wishing to be bound by any particular theory, one way to look at the results discovered here, for an accounting of the data, is to start with a comparison of high molecular weight polymers. It is well known that linear, high molecular weight, cationic polymers are effective sludge dewatering agents because of their ability to bridge across suspended particles and produce a larger floc. One can rationalize that the mixtures or blends of these high molecular weight, linear polymers with low molecular weight cationics in the prior art may provide a branching effect in space, thereby improving dewatering.

It was therefore very surprising and unexpected, when the unsheared, branched, high molecular weight, cationic polymer/low molecular weight, linear, cationic polymer blends of the instant invention provided improved dewatering, relative to the blend of high molecular weight and linear, low molecular weight cationics, and even to the branched high molecular weight, cationic materials per se.

DESCRIPTION OF THE INVENTION INCLUDING PREFERRED EMBODIMENTS

The present invention provides a process for releasing water from a dispersion of suspended solids which comprises:

A. adding to said dispersion an effective amount of:
  1. an unsheared, water-soluble, branched, cationic polymer, having a solution viscosity of at least about 1.8 mPa.s measured in a Brookfield viscometer, with a UL adapter, at 25° C. on a 0.1%, by weight, polymer solution in 1M NaCl at 60 rpm, a solubility quotient of greater than about 30% and a branching agent content from about 4 to 100 molar parts per million based on initial monomer content, and
  2. a cationic, water-soluble polymer having a molecular weight below one million and
B. dewatering the mixture of the dispersion of suspended solids and the polymers.

The present invention also relates to a water-in-oil emulsion comprising a continuous oil phase containing at least one emulsifier and a discontinuous aqueous phase containing a mixture of 1) a cationic, water-soluble polymer having a molecular weight of below about one million and 2) and unsheared, water-soluble, branched, cationic polymer having a solution viscosity of at least about 1.8 mPa.s measured in a Brookfield viscometer with a UL adapter at 25° C. on a 0.1 percent, by weight, polymer solution in 1M NaCl at 60 rpm, a solubility quotient of greater than about 30% and a branching agent content of from about 4 to about 100 molar parts per million, based on initial monomer content, the ratio of 1) to 2) ranging from about 50:1 to about 1:50.

The first polymer used in the present invention is an unsheared, water-soluble, branched, cationic polymer having a solution viscosity of at least about 1.8 mPa.s measured in a Brookfield viscometer, with a UL adapter, at 25° C. on a 0.1%, by weight, polymer solution in 1M NaCl at 60 rpm, a solubility quotient of greater than about 30% and a branching agent content from about 4 to 100 molar parts per million, based on initial monomer content, preferably about 4 to about 80 molar parts per million, same basis.

These polymers are disclosed and claimed in copending U.S. patent application, Ser. No. 07/285,933, filed Dec. 19, 1988 by Neff et al, hereby incorporated herein by reference. Preferably, these polymeric flocculants possess a solubility quotient of greater than about 40 percent, the branching agent 10 comprises from about 8 to about 20 molar parts per million, based on original monomer content, and exhibit a solution viscosity of at least about 2.0, preferably about 2.2 and most preferably 2.4 mPa.s, measured as above. The term "unsheared," when used herein and in the appended claims, does not exclude normal mixing which is used to disperse polymers. For example, mixing with a magnetic stirrer as will be described hereinafter will not produce a "sheared" polymer but the polymer will be "unsheared" within the meaning of the claims even after 2 hours of mixing.

The unsheared, highly branched, water-soluble, polymers are formed by the polymerization of cationic ethylenically unsaturated monomers, alone or with other comonomers, and in the presence of a branching agent and a chain-transfer agent in optimum proportions.

Cationic monomers useful in producing these polymers include diallyldialkylammonium halides, such as diallyldimethylammonium chloride; acryloxyethyltrimethylammonium chloride; (meth)acrylates of N,N-dialkylaminoalkanol compounds and quaternaries and salts thereof, such as N,N-dimethylaminoethylacrylate methylchloride salt; N,N-dialkylaminoalkyl(meth)acrylamides and salts and quaternaries thereof, such as N,N-dimethylaminoethylacrylamide; methacrylamidopropyltrimethylammonium chloride; 1-methacryloyl-4-methyl piperazine and the like. Such cationic monomers are generally of the following formulae;

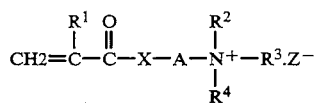
(I)

where $R^1$ is hydrogen or methyl, $R^2$ is hydrogen or lower alkyl of $C_1$ to $C_4$, $R^3$ and/or $R^4$ are hydrogen, alkyl of $C_1$ to $C_{12}$, aryl or hydroxyethyl and $R_2$ and $R_3$ or $R_2$ and $R_4$ can combine to form a cyclic ring containing one or more hetero atoms, Z is the conjugate base of an acid, X is oxygen or $-NR^1-$ and A is an alkylene group of $C_1$ to $C_{12}$; or

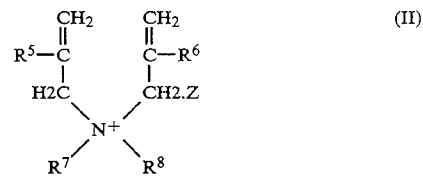
(II)

where $R^5$ and $R^6$ are hydrogen or methyl, $R^7$ is hydrogen, alkyl of $C_1$ to $C_{12}$ or benzyl, and $R^8$ is hydrogen, alkyl of $C_1$ to $C_{12}$ benzyl or hydroxyethyl; and Z is as defined above.

Comonomers, suitable for copolymerization with the cationic monomers of Formulae I or II above, generally comprise acrylamide; methacrylamide; N-alkylacrylamides such as N-methylacrylamide; N,N-dialkylacrylamides; such as N,N'-dimethylacrylamide; methyl acrylate; methyl methacrylate; acrylonitrile; N-vinylmethylacetamide or formamide; vinyl acetate, N-vinyl pyrrolidone, and the like.

These ethylenically unsaturated monomers may be copolymerized to produce cationic copolymers. Preferably, a nonionic monomer, such as an acrylamide is copolymerized with a cationic comonomer to produce a cationic copolymer. Acrylamide copolymers, useful in the practice of the process of this invention, comprise from about 1 to about 99 parts, by weight, based on the total weight of the polymer, of acrylamide monomer and from about 99 to about 1 part, by weight, same basis, of the comonomer. Preferably, the acrylamide copolymer comprises from about 10 to about 99 parts, by weight, acrylamide monomer and from about 90 to about 1.0 part, by weight, comonomer, same basis.

Polymerization of the monomers occurs in the presence of a polyfunctional branching agent to form the branched cationic homopolymer or copolymer. The polyfunctional branching agent comprises a compound having either at least two double bonds, a double bond and a reactive group or two reactive groups. Polyfunctional branching agents should have at least some water-solubility. Illustrative of those containing at least two double bonds are N,N-methylenebisacrylamide; polyethyleneglycol diacrylate; polyethyleneglycol dimethacrylate; N-vinyl acrylamide; divinylbenzene, triallylammonium salts, N-methylallylacrylamide, and the like. Polyfunctional branching agents containing at least one double bond and at least one reactive group include glycidyl acrylate, acrolein, methylolacrylamide, and the like. Polyfunctional branching agents containing at least two reactive groups include aldehydes, such as glyoxal, and diepoxy compounds, epichlorohydrin and the like.

Branching agents should be used in sufficient quantities to assure a highly branched copolymer product having a branching agent content of from about 4 to about 100 molar parts per million, based on initial monomer content, so as to induce sufficient branching of the polymer chain.

The addition of, in optimum concentration, a molecular weight modifying or chain-transfer agent to control the structure and solubility of the cationic polymer is also necessary. In the absence of a chain-transfer agent, the incorporation of even extremely small amounts of branching agent, e.g. 5 parts per million, may cause crosslinking, rendering the polymer insoluble in water. However, soluble, highly branched, cationic, polymer products are obtained when a chain-transfer agent is used, in optimum concentration, in conjunction with said branching agent. Many such chain-transfer agents are well known to those skilled in the art. These include alcohols; mercaptans; thioacids; phosphites and sulfites, such as isopropyl alcohol and sodium hypophosphite, although many different chain-transfer agents may be employed.

It is extremely important that optimum concentrations of chain-transfer agent be applied in order to produce a highly branched, water-soluble polymer. Addition of too little chain-transfer agent produces a nonsoluble polymer and the addition of too much chain-transfer agent produces a polymer with too low a solution viscosity, i.e. molecular weight.

The optimum concentration of chain-transfer agent, can be determined by measuring the solubility quotient. The solubility quotient is defined as the total mole % cationicity in the polymer as determined by an anion binding technique (CEQ), e.g. colloid titration, divided by the total cationicity as determined by analytical technique which does not depend on anion binding, using, e.g., nuclear magnetic resonance, infra red spectroscopy or chemical analysis, the quotient of which is multiplied by 100. The cationicity is determined by measuring the CEQ as described in Volume 62, Number 7 of the Journal of Chemical Education dated July 1985 at pages 627 to 629, which comprises measuring the cationicity of a solution using colloid titration to determine the solubility in water. Use of a chain-transfer agent in concentrations such that the solubility quotient is less than 30 percent provides polymers that are not soluble. Only when optimum concentrations are used, effectuating a solubility quotient greater than 30 percent, do the polymers exhibit the required solubility characteristics. Thus, the soluble, cationic, polymers all possess a minimum solubility quotient of over 30 percent, preferably, over 40 percent and, even more preferably, over 50 percent. Many exhibit a solubility quotient of greater than 90 percent.

Actual polymerization may be carried out using gel or emulsion (suspension) polymerization techniques. Emulsion polymerization is preferred.

Emulsion polymerization procedures involve the preparation of two phases. The aqueous phase comprises the monomer(s), branching agent and chain-transfer agent dissolved in deionized water, and other additives well known to those skilled in this art, such as stabilizers and pH adjusters. The oil phase comprises a water-insoluble hydrocarbon solution of surfactant(s). The aqueous phase and oil phase are mixed and homogenized in a conventional apparatus until particle size is in the 1.0 micron range and a suitable bulk viscosity is obtained. The emulsion is then transferred to a suitable flask wherein the emulsion is agitated and sparged with nitrogen for about thirty minutes. A polymerization initiator, such as sodium metabisulfite solution, is then continuously added to the solution to begin polymerization. Polymerization is allowed to exotherm to the desired temperature which is maintained by cooling until cooling is no longer required. Finished emulsion product is cooled to 25° C.

Any conventional additives may be used to stabilize the aqueous phase and oil phase solution. Suitable additives include ammonium sulfate, ethylenediaminetetraacetic acid (disodium salt) and diethylene triaminepentaacetate (pentasodium salt). See Modern Plastics Encyclopedia/88, McGraw Hill, October 1987, pp. 147-8.

Most known free-radical initiators may be employed to initiate polymerization. Suitable for use are azobisisobutyronitrile; oxygen with sodium sulfite, and/or sodium metabisulfite; 2,2,-azobis(2-methyl-2-amidinopropane)dihydrochloride; ammonium persulfate and ferrous ammonium sulfate hexahydrate, or other redox pairs. Organic peroxides may also be employed for polymerizing ethylenically unsaturated monomers. Particularly useful for the purpose of this invention is t-butyl hydroperoxide, see Modern Plastics Encyclopedia/88, McGraw Hill, October 1987, pp. 165-8.

Standard quaternizing agents such as methyl chloride, methyl bromide, dimethyl sulfate or acids such as HCl, $H_2SO_4$, acetic acid etc., may be used to produce the cationic polymers useful herein.

In a typical gel polymerization procedure, monomer(s), branching agent and chain-transfer agent are dissolved in deionized water and the pH is adjusted as desired. The solution is placed in a polymerization vessel and sparged with nitrogen with the temperature of the solution adjusted to about 10° C. An initiator is then added, and the polymerization is allowed to exotherm to maximum temperature. Once maximum temperature is attained, the media is placed in an oven at about 70° C. for about 8 hours. The resulting gel is reduced to gel worms, air dried and reduced to powder.

The second polymer used in the process of this invention comprises a cationic, water-soluble polymer with a molecular weight below about one million. Examples of such cationic polymers are:

a) Amine-epihalohydrin condensates as described in U.S. Pat. Nos. Re 28,807 and 28,808. Preferred species are those formed from dimethylamine and epichlorohydrin.

b) Polydiallyldimethylammonium acid salts.

c) Melamine/formaldehyde acid colloids.

d) Homopolymers of vinylic cationic monomers such as N,N-dialkylaminoalkyl acrylate and methacrylate quaternaries or acid salts; N,N-dialkylaminoalkyl acrylamide and methacrylamide quaternary or acid salts, and vinyl imidazoliums, N- or C-substituted.

e) Copolymers of acrylamide and vinylic cationic monomers containing sufficient amounts of the latter such that the polymers is rendered high in cationcity, said monomers including those from which the polymers designated in groups (b) and (d), above, are produced.

f) Dialkylaminomethylated polyacrylamides in their quaterized or protonated form and, g) Polyethylenimines which are quaternized or highly protonated.

The process of the present invention is conducted by adding the two polymers, above, singularly, in combination, as solutions or, preferably as the water-in-oil emulsions described above, to a dispersion of suspended solids. The polymers are employed in weight ratios to each other of about 50:1 to 1:50, preferably from about 25:1 to 1:25 and most preferably from 10:1 to about 1:10, respectively.

The novel emulsions of the present invention are produced by adding an aqueous solution of the cationic polymer having a molecular weight below one million to a water-in-oil emulsion of the unsheared, water-soluble, branched, cationic polymer, which is prepared as described hereinabove, to produce the desired concentrations of each polymer. The resultant emulsions are stable and can be used as such to release water from a dispersion of suspended solids or can be used inverted as is known in the art. Upon addition of the low molecular weight polymer solution of the branched polymer emulsion, the low molecular weight polymer solution becomes part of the aqueous phase of the emulsion of the branched polymer and thus forms an emulsion of the two polymers in the aqueous phase.

Alternatively the two polymers may be mixed as aqueous solutions prior to use or may be added separately to effect the solid-liquid separation.

A wide range of solid-liquid separation operations may be achieved by the process of this invention. Suspended solids and other industrial sludges may be dewatered, cellulosic suspensions such as those found in paper production may be drained and various inorganic suspensions may be settled.

The polymers, alone or in combination, are added to the dispersion of suspended solids in an effective amount. Typically, total amounts of the polymers ranging from about 1 to about 100 lb/ton can be employed, depending on substrate.

The following examples are set forth for purposes of illustration only and are not to be construed as limitations on the present invention except as set forth in the appended claims. All parts are by weight unless otherwise specified.

In the examples, the dewatering test conditions are as follows: Polymer solutions (30 mls) and sludge (175 grams) are mixed together for 3 minutes at either 50 or 75 rpm and then pressed at 15 or 20 psi between two pieces of belt press material for three minutes. Conditions are constant within each table.

EXAMPLE 1

A mixed primary and secondary sludge containing 2 to 5 wt. % solids, from the Greenwich, Connecticut Municipal Sewage Treatment Plant, is dewatered using the polymers set forth below with appropriate controls, by the above test method. The results are shown in Table I, below.

TABLE I

| | Greenwich, CT $1^0/2^0$ Sludge Dewatering | | | |
|---|---|---|---|---|
| Polymer | Dose #/Ton | Yield % | Cake Solids (%) | Cake Rating |
| A* | 8.83 | 69.8 | 14.9 | 5 |
| | 11.04 | 86.1 | 14.5 | 3 |
| | 13.25 | 79.2 | 12.7 | 5 |
| B* | 8.83 | | NO-CAKE | |
| | 11.04 | 72.7 | 15.9 | 3 |
| | 13.25 | 84.3 | 15.4 | 1 |
| | 15.44 | 90.2 | 16.6 | 0 |
| | 17.66 | 85.3 | 14.8 | 4 |
| C | 8.83 | 77.2 | 15.5 | 3 |
| | 11.04 | 83.3 | 16.1 | 2 |
| | 13.25 | 89.0 | 17.1 | 0 |
| | 15.44 | 88.0 | 17.5 | 2 |
| D* | 8.83 | 70.7 | 15.5 | 3 |
| | 11.04 | 84.7 | 15.5 | 2 |
| | 13.25 | 80.0 | 14.5 | 4 |

* = Comparative

Polymer A is an acrylamide/acryloxyethyltrimethylammonium chloride (AETAC) (60/40 mole ratio) copolymer having a solution viscosity of 3.3 mPa.s, and is unbranched, i.e., no methylenebisacrylamide is used in its preparation.

Polymer B is branched acrylamide/AETAC (60/40, mole ratio) copolymer having a solution viscosity of 3.2 mPa.s and containing 13 ppm of methylenebisacrylamide (MBA).

Polymer C is a mixture of the branched Polymer B, and a dimethylamine/epichlorohydrin polyquaternary of molecular weight 50,000, in a real weight ratio of the two polymers of 70/30, respectively.

Polymer D is a mixture of the unbranched Polymer A, and a dimethylamine/epichlorohydrin quaternary of molecular weight 50,000, in a real weight ratio of the two polymers of 70:30, respectively.

The Yield % column reflects the total capture of solids in the dewatering process, the Cake Solids % show the % dryness of the dewatered cake and the Cake Rating is an estimation of the manageability of the cake. The latter parameter is a qualitative measure on a 0 to 5 scale of the blinding of the screen and the removability of the cake and its integrity; where a digit of 0 represents the ideal cake, digits 1 and 2 represent manageable cakes, 3 is a borderline case and 4 to 5 depict unsatisfactory sludge masses.

A rearrangement of part of the data in Table I can be made for purposes of greater clarity. For example, aligning all the results at a dosage level of 13.25 #/ton leads to the compilation:

TABLE IA

| Polymer | Code | Yield (%) | Cake Solids (%) | Cake Rating |
|---|---|---|---|---|
| Unbranched* | (A) | 79.2 | 12.7 | 5 |
| Unbranched + Polyquat* | (D) | 80.0 | 14.5 | 4 |
| Branched* | (B) | 84.3 | 15.4 | 1 |
| Branched + Polyquat | (C) | 89.0 | 17.1 | 0 |

* = Comparative which clearly shows the significance of this invention: demonstrating the clear progression of performance in three important parameters from linear, high molecular weight polymers of the prior art, to mixtures of the same with polyamines, to the branched structures to the same branched structures in combination with lower molecular weight highly charged polymers, which are the subject of this application.

EXAMPLE 2

The effect of adding a polyquat to a branched polymer of a different composition (higher mole amounts of AETAC) is demonstrated on the same sludge, a Greenwich, Connecticut primary/secondary mixture, in Table II, below.

TABLE II

| Polymer | Dose #/Ton | Yield % | Cake Solids % | Cake Rating | Free Drainage |
|---|---|---|---|---|---|
| E* | 8.9 | 87.6 | 19.6 | 4 | 65 |
| | 10.7 | 100.0 | 22.1 | 1 | 100 |
| | 12.5 | 100.0 | 23.2 | 1 | 130 |
| | 14.3 | 91.3 | 21.1 | 5 | 90 |
| F | 8.9 | 95.5 | 22.2 | 4 | 75 |
| | 10.7 | 97.0 | 26.1 | 2 | 125 |
| | 12.5 | 95.0 | 24.8 | 1 | 135 |
| | 14.3 | 93.6 | 23.2 | 4 | 125 |

Polymer E is a branched acrylamide/AETAC copolymer with a mole ratio of 45/55, having a S.V. of 3.1 mPa.s, a CEQ of 64% and containing 7 ppm of MBA.

Polymer F is a blend of copolymer (E) with the dimethylamine/epichlorohydrin polyquat described in Table I, above. The data of Table II show the beneficial effect of dewatering with the branched polymer in the presence of the highly charged polyquaternary.

A new performance parameter is introduced in this table of data, viz., the Free Drainage. This number measures the readiness and speed of water drainage from the cake and relates to productivity in the field. The higher the number, the more rapidly can the plant run its sludge through the belt dewatering section resulting in time saved and production efficiency. The added effectiveness of the polymer mixture is shown in this table, especially at an optimum dosage such as 10.7 #/ton.

EXAMPLE 3

Table III is a further exemplification of the benefits of the use of the flocculant blend of the present invention wherein a second polyamine is utilized in conjunction with branched and unbranched acrylamide/AETAC polymers. The comparative data clearly shows the branched polymer/polyamine blends overall function more efficiently in sludge dewatering, compare specifically, Polymers H, I, and J at a Dosage of 12:5.

TABLE III

Greenwich $1^0/2^0$ Sludge Dewatering

| Polymer Additive | Dose (lb/Ton) | Free Drainage (Mls) | Cake Solids (%) | Yield (%) | Cake Rating |
|---|---|---|---|---|---|
| A* | 7.1 | 85 | 22.7 | 81.1 | 4 |
|    | 8.9 | 125 | 21.9 | 89.9 | 3 |
|    | 10.7 | 135 | 22.2 | 88.4 | 4 |
|    | 12.5 | 100 | 21.1 | 83.3 | 5 |
|    | 14.3 | 100 | 23.5 | 77.9 | 5 |
| G* | 7.1 | 65 | — | — | — |
|    | 8.9 | 115 | 23.5 | 89.0 | 3 |
|    | 10.7 | 135 | 23.5 | 95.6 | 2 |
|    | 12.5 | 130 | 20.8 | 80.2 | 3 |
|    | 14.3 | 95 | 21.4 | 85.2 | 5 |
| D* | 7.1 | 105 | 24.0 | 80.0 | 4 |
|    | 8.9 | 135 | 22.5 | 93.6 | 4 |
|    | 10.7 | 120 | 22.1 | 85.8 | 4 |
|    | 12.5 | 120 | 21.8 | 89.0 | 4 |
|    | 14.3 | 100 | 22.4 | 82.4 | 4 |
| H* | 7.1 | 85 | 22.6 | 90.0 | 2 |
|    | 8.9 | 115 | 23.8 | 89.9 | 2 |
|    | 10.7 | 115 | 23.5 | 87.9 | 2 |
|    | 12.5 | 120 | 21.5 | 89.9 | 4 |
|    | 14.3 | 143 | 22.9 | 90.0 | 4 |
| I | 7.1 | 115 | 22.2 | 79.4 | 4 |
|   | 8.9 | 130 | 25.5 | 93.2 | 2 |
|   | 10.7 | 135 | 25.3 | 92.7 | 2 |
|   | 12.5 | 135 | 25.3 | 92.7 | 2 |
|   | 14.3 | 135 | 26.3 | 94.0 | 2 |
| J | 7.1 | 110 | 24.6 | 75.4 | 5 |
|   | 8.9 | 125 | 26.1 | 87.4 | 3 |
|   | 10.7 | 135 | 26.6 | 99.6 | 2 |
|   | 12.5 | 135 | 26.2 | 93.1 | 3 |
|   | 14.3 | 140 | 26.7 | 96.3 | 3 |

Polymer G = Polymer A plus a dimethylamine/epichlorhydrin polyamine having a M.W. of 250,000 (70/30).
Polymer H = A branched acrylamide/AETAC (60/40) copolymer having an S.V. of 3.1 mPa · s, a CEQ(s) of 107%, a CEQ of 73% and containing 10 ppm of MBA and 0.5% of isopropyl alcohol (IPA)
Polymer I = Polymer H and 30% of the polyamine component of Polymer A
Polymer J = Polymer H and 30% of the polyamine component of Polymer G

EXAMPLE 4

In Table IV, a comparative showing is made utilizing blends of branched acrylamide/AETAC polymers of varying S.V. in conjunction with Mannich polyacrylamides produced by reacting polyacrylamide with dimethylamine and formaldehyde. As can be readily appreciated, the overall effect of the flocculant blend is increased Cake Solids and improved Free Drainage and Cake Rating; see Polymers K and L, especially at 11.10 dosage, and Polymers H and M at 9.5 dosage.

TABLE IV

Greenwich $1^0/2^0$ Sludge Dewatering

| Polymer Additive | Dose (lb/Ton) | Free Drainage (Mls) | Cake Solids (%) | Yield (%) | Cake Rating |
|---|---|---|---|---|---|
| K* | 4.75 | 50 | 21.1 | 90.6 | 4 |
|    | 6.30 | 80 | 22.6 | 95.2 | 3 |
|    | 7.90 | 105 | 23.1 | 98.5 | 1 |
|    | 9.50 | 105 | 24.1 | 99.3 | 1 |
|    | 11.10 | 85 | 20.9 | 96.5 | 4 |
| L | 4.75 | 50 | 22.7 | 79.8 | 5 |
|   | 6.30 | 60 | 23.0 | 82.5 | 3 |
|   | 7.90 | 85 | 23.5 | 93.5 | 1 |
|   | 9.50 | 95 | 23.6 | 95.4 | 1 |
|   | 11.10 | 105 | 23.5 | 94.9 | 1 |
| H* | 4.75 | 50 | 13.9 | 95.2 | 3 |
|    | 6.30 | 80 | 22.7 | 92.7 | 3 |
|    | 7.90 | 110 | 23.7 | 99.2 | 1 |
|    | 9.50 | 100 | 23.8 | 98.2 | 2 |
|    | 11.10 | 50 | 20.9 | 72.7 | 5 |
| M | 4.75 | 45 | 21.8 | 83.6 | 4 |
|   | 6.30 | 75 | 22.2 | 88.1 | 3 |
|   | 7.90 | 105 | 24.0 | 93.0 | 1 |
|   | 9.50 | 105 | 24.0 | 95.0 | 1 |
|   | 11.10 | 100 | 24.1 | 99.2 | 3 |

Polymer K = A branched acrylamide/AETAC (60/40) copolymer having an S.V. of 2.7 mPa · s and a CEQ of 73% and containing 13 ppm of MBA and 0.5% of IPA.
Polymer L = Polymer K plus a Mannich polyacrylamide having a M.W. of 3–4 × $10^5$.
Polymer M = Polymer H plus the Mannich polyacrylamide of Polymer L.

EXAMPLE 5

The use of a pair of branched polymers of acrylamide/AETAC and a pair of polydiallyldimethylammonium chloride polymers is shown in Table V. Comparing Polymers H,N and O, especially at dosage 10.5, and Polymers K,P and Q, especially at dosages 10.5 and 12.3, respectively, shows that Free Drainage, Cake Solids and Cake Rating, as a whole, are improved by the use of the flocculant blends.

TABLE V

Greenwich $1^0/2^0$ Sludge Dewatering

| Polymer Additive | Dose (lb/Ton) | Free Drainage (Mls) | Cake Solids (%) | Yield (%) | Cake Rating |
|---|---|---|---|---|---|
| H* | 5.2 | 50 | 20.8 | 85.6 | 4 |
|    | 7.0 | 45 | 19.5 | 88.0 | 5 |
|    | 8.8 | 110 | 21.7 | 95.6 | 2 |
|    | 10.5 | 100 | 21.5 | 94.2 | 4 |
| N | 5.2 | 55 | 21.6 | 80.9 | 5 |
|   | 7.0 | 90 | 21.8 | 89.7 | 5 |
|   | 8.8 | 105 | 22.0 | 94.6 | 3 |
|   | 10.5 | 105 | 22.3 | 96.8 | 2 |
|   | 12.3 | 95 | 21.7 | 93.7 | 5 |
| O | 5.2 | 60 | 22.7 | 79.2 | 5 |
|   | 7.0 | 90 | 21.7 | 93.3 | 2 |
|   | 8.8 | 110 | 22.5 | 86.0 | 3 |
|   | 10.5 | 105 | 22.9 | 99.3 | 2 |
|   | 12.3 | 95 | 23.0 | 92.6 | 4 |
| K* | 5.2 | 45 | — | — | — |
|    | 7.0 | 80 | 21.0 | 93.7 | 2 |
|    | 8.8 | 80 | 21.8 | 97.0 | 2 |
|    | 10.5 | 110 | 22.4 | 95.6 | 1 |
|    | 12.3 | 70 | 19.0 | 79.9 | 5 |
| P | 5.2 | 40 | — | — | — |
|   | 7.0 | 80 | 20.7 | 91.2 | 2 |
|   | 8.8 | 95 | 22.7 | 90.5 | 3 |
|   | 10.5 | 105 | 22.2 | 92.6 | 3 |
|   | 12.3 | 95 | 21.0 | 87.2 | 5 |
| Q | 5.2 | 55 | 20.0 | 81.1 | 5 |
|   | 7.0 | 90 | 21.4 | 92.1 | 4 |
|   | 8.8 | 95 | 21.8 | 95.8 | 2 |
|   | 10.5 | 105 | 22.4 | 95.1 | 2 |

TABLE V-continued

Greenwich 1°/2° Sludge Dewatering

| Polymer Additive | Dose (lb/Ton) | Free Drainage (Mls) | Cake Solids (%) | Yield (%) | Cake Rating |
|---|---|---|---|---|---|
| | 12.3 | 105 | 22.9 | 98.4 | 2 |

Polymer N = Polymer H plus poly(diallyldimethyl ammonium chloride) (PDADM) of 200,000 M.W.
Polymer O = Polymer H plus poly(diallyldimethyl ammonium chloride) of 500,000 M.W.
Polymer P = Polymer K plus PDADM of Polymer N
Polymer Q = Polymer K plus PDADM of Polymer O

EXAMPLE 6

Comparing Polymers H and R, exemplifying a polyimine co-flocculant system, and K and S, a second polyimine system, it can be seen that the presence of the polyimine enhances the flocculation ability of the branched Polymers H and K, especially at dosage 12.3, see Table VI.

TABLE VI

Greenwich 1°/2° Sludge Dewatering

| Polymer Additive | Dose (lb/Ton) | Free Drainage (Mls) | Cake Solids (%) | Yield (%) | Cake Rating |
|---|---|---|---|---|---|
| H* | 6.1 | 55 | — | — | — |
| | 7.7 | 100 | 22.6 | 90.6 | 1 |
| | 9.2 | 110 | 23.8 | 87.1 | 2 |
| | 10.8 | 120 | 16.7 | 93.7 | 0 |
| | 12.3 | 120 | 16.7 | 89.9 | 5 |
| R | 6.1 | 60 | — | — | — |
| | 7.7 | 85 | 23.0 | 89.2 | 5 |
| | 9.2 | 110 | 23.7 | 91.1 | 2 |
| | 10.8 | 130 | 24.2 | 95.2 | 1 |
| | 12.3 | 130 | 24.3 | 98.0 | 1 |
| K* | 6.1 | 50 | — | — | — |
| | 7.7 | 70 | 22.7 | 86.9 | 4 |
| | 9.2 | 100 | 22.8 | 85.4 | 4 |
| | 10.8 | 120 | 23.6 | 93.5 | 1 |
| | 12.3 | 130 | 24.0 | 96.0 | 1 |
| S | 6.1 | 40 | — | — | — |
| | 7.7 | 65 | 23.4 | 81.1 | 4 |
| | 9.2 | 75 | 23.0 | 82.3 | 5 |
| | 10.8 | 120 | 23.9 | 93.9 | 1 |
| | 12.3 | 135 | 25.6 | 95.1 | 1 |

Polymer R = Polymer H plus a polyethylene imine
Polymer S = Polymer K plus a polyethylene imine

EXAMPLE 7

The data of Table VII is compiled utilizing Polymer H, alone and conjunction with two melamine/formaldehyde acid colloids, at varying concentrations. Note specifically the increased cake solids at a dosage of 10.5.

TABLE VII

Greenwich 1°/2° Sludge Dewatering

| Polymer Additive | Dose (lb/Ton) | Free Drainage (Mls) | Cake Solids (%) | Yield (%) | Cake Rating |
|---|---|---|---|---|---|
| H* | 5.2 | 35 | — | — | — |
| | 7.0 | 70 | 20.0 | 93.9 | 2 |
| | 8.8 | 100 | 20.9 | 95.8 | 1 |
| | 10.5 | 90 | 20.0 | 91.4 | 3 |
| | 12.3 | 55 | 19.3 | 73.9 | 5 |
| T | 5.2 | 30 | — | — | — |
| | 7.0 | 35 | — | — | — |
| | 8.8 | 65 | 21.0 | 84.2 | 4 |
| | 10.5 | 85 | 21.5 | 88.6 | 3 |
| | 12.3 | 110 | 21.8 | 93.9 | 2 |
| U | 5.2 | 25 | — | — | — |
| | 7.0 | 35 | — | — | — |
| | 8.8 | 55 | 20.5 | 86.0 | 4 |
| | 10.5 | 85 | 22.3 | 87.6 | 3 |
| | 12.3 | 110 | 22.4 | 95.6 | 2 |
| V | 7.0 | 50 | 25.5 | 93.7 | 5 |
| | 8.8 | 90 | 21.7 | 91.4 | 2 |
| | 10.5 | 90 | 20.4 | 92.1 | 5 |

Polymer T = Polymer H plus a melamine/formaldehyde acid colloid (70/30).
Polymer U = Polymer H plus a different melamine/formaldehyde acid colloid than Polymer Q (70/30).
Polymer V = Polymer H plus the acid colloid component of Polymer U (90/10).

EXAMPLES 9-11

The procedure of Example 3 is again followed in each instance except that the AETAC comonomer of Polymer H is replaced by equivalent amount of 9) methacryloxytrimethylammonium methosulfate, 10) methacrylamidopropyltrimethylammonium chloride, and 11) diallyldimethylammonium chloride. In each instance, similar results are achieved.

EXAMPLE 12

Following the procedure of Example 4 except that the acrylamide copolymer L is replaced by a homopolymer of dimethylaminoethylacrylate methyl chloride salt having an S.V. of 2.0 mPa.s and a CEQ of 9.1% and containing 44.1 ppm of MBA and 1.0 IPA, similar results are achieved.

EXAMPLES 13-15

The procedure of Example 12 is again followed except that the homopolymers are prepared from 13) methacryloxytrimethyl ammonium chloride, 14) methacrylamidopropyltrimethylammonium methosulfate and 15) diallyldimethylammonium chloride. Substantially equivalent results are observed.

EXAMPLE 16

Polymer C of Example 1 is formed by adding the dimethylamine/epichlorohydrin polyquaternary to a water-in-oil emulsion of branched Polymer B prepared as described in the above-referenced pending U.S. patent application. When used to dewater sludge, similar results are achieved.

EXAMPLE 17

The procedure of Example 16 is again followed except that an aqueous solution of the Mannich polyacrylamide of Polymer L is added to a water-in-oil emulsion of Polymer K. When the resultant emulsion is added to sludge, effective dewatering thereof is achieved.

EXAMPLE 18

Again following the procedure of Example 16, an excellent water-in-oil emulsion is formed when an aqueous solution of the poly(diallyldimethylammonium chloride) of Polymer O is added to a water-in-oil emulsion of Polymer H. Effective dewatering occurs when the water-in-oil emulsion of the two polymers is added to sludge.

EXAMPLES 19-20

The polyethylene imine of Polymer S, Example 19, and the acid colloid of Polymer T, as aqueous solutions, are each individually added to a water-in-oil emulsion of Polymer H according to the procedure of Example 16. In each instance, excellent water-in-oil emulsions of the blended polymers result, which emulsions both effectively dewater sludge when added thereto.

What is claimed:

1. A water-in-oil emulsion comprising a continuous oil phase containing at least one emulsifier and a discontinuous aqueous phase containing a mixture of 1) a cationic, water-soluble polymer having a molecular weight of below about one million and 2) an unsheared, water-soluble, branched, cationic polymer having a solution viscosity of at least about 1.8 mPa.s measured in a Brookfield viscometer with a UL adapter at 25° C. on a 0.1 percent, by weight, polymer solution in 1M NaCl at 60 rpm, a solubility quotient of greater than about 30% and a branching agent content of from about 4 to about 100 molar parts per million, based upon initial monomer content, the ratio of 1) to 2) ranging from about 50:1 to about 1:50.

2. An emulsion according to claim 1 wherein polymer 2 has a solution viscosity of at least about 2.0 mPa.s.

3. An emulsion according to claim 1 wherein polymer 2 has a solution viscosity of a least about 2.4 mPa.s.

4. An emulsion according to claim 1 wherein polymer 2 is a polymer formed from one or more ethylenically unsaturated monomers selected from the group consisting of acrylamide; methacrylamide; N,N-dialkylacrylamides; N-alkyl acrylamide; N-vinyl methylacetamide; N-vinylmethyl formamide; vinyl acetate; N-vinyl pyrrolidone; N,N-dialkylaminoalkylacrylates and methacrylates and their quaternary or acid salts; N,N-dialkyl aminoalkylacrylamides and methacrylamides and their quaternary or acid salts or diallyl dimethylammonium salts.

5. An emulsion according to claim 1 wherein polymer 2 is a copolymer of acrylamide and acryloxyethyltrimethylammonium chloride.

6. An emulsion according to claim 1 wherein polymer 1 is selected from the group consisting of amine/epihalohydrin polyamines; Mannich acrylamide polymers; polydiallylammonium acid salts; polyethylenimines, melamine/formaldehyde acid colloids; homopolymers of vinylic cationic monomers and copolymers of vinylic, cationic monomers with from about 10-50 mole percent of acrylamide.

7. An emulsion according to claim 6 wherein polymer 1 is a dimethylamine/epichlorohydrin polyamine.

8. An emulsion according to claim 6 wherein polymer 1 is a Mannich polyacrylamide.

* * * * *